United States Patent

Aumueller et al.

[11] Patent Number: 4,925,888
[45] Date of Patent: May 15, 1990

[54] MIXTURE FOR STABILIZING POLYURETHANES

[75] Inventors: Alexander Aumueller, Deidesheim; Peter Neumann, Wiesloch; Peter Spang, St. Ingbert; Guenter Matzke, Heidelberg; Hubert Trauth, Dudenhofen, all of Fed. Rep. of Germany

[73] Assignee: BASF Aktiengesellschaft, Ludwigshafen, Fed. Rep. of Germany

[21] Appl. No.: 260,612

[22] Filed: Oct. 21, 1988

[30] Foreign Application Priority Data

Oct. 21, 1987 [DE] Fed. Rep. of Germany ....... 3735577

[51] Int. Cl.$^5$ ............................ C08K 5/34; C08K 5/51
[52] U.S. Cl. ...................................... 524/91; 524/102; 524/110; 524/132
[58] Field of Search .................. 524/91, 102, 110, 132

[56] References Cited

U.S. PATENT DOCUMENTS

| Re. 31,343 | 8/1983 | Holt et al. | 546/188 |
|---|---|---|---|
| 3,629,191 | 12/1971 | Heller et al. | 524/91 |
| 4,511,685 | 4/1985 | Missen et al. | 524/110 |

FOREIGN PATENT DOCUMENTS

| 57160 | 6/1982 | European Pat. Off. | |
|---|---|---|---|
| 3634531 | 4/1988 | Fed. Rep. of Germany | |
| 61031 | 4/1982 | Japan | 524/91 |
| 1163965 | 7/1986 | Japan | 524/102 |
| 275350 | 12/1986 | Japan | 524/91 |

*Primary Examiner*—John Kight, III
*Assistant Examiner*—Kriellion Morgan
*Attorney, Agent, or Firm*—Oblon, Spivak, McClelland, Maier & Neustadt

[57] ABSTRACT

A mixture for stabilizing polyurethanes contains
(a) an amine of the formula I

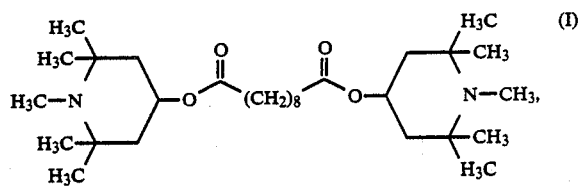

(b) a mixture of the benzotriazoles II and III

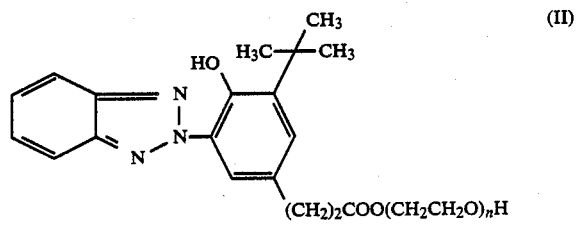

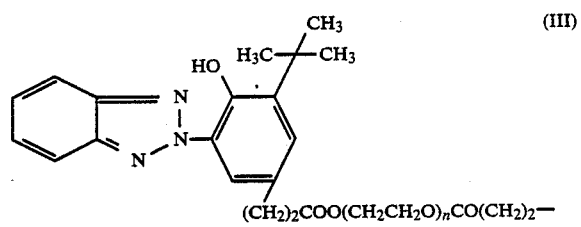

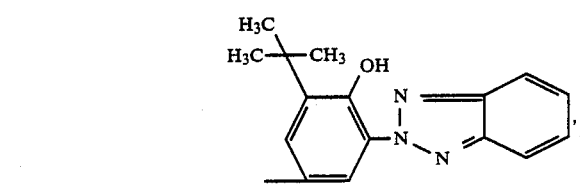

in which n is chosen so that the mean molecular weight of the mixture is greater than 600, and
(c) α-tocopherol, if necessary mixed with tris-(nonylphenyl) phosphite, and polyurethanes contain from 0.005 to 5.0% by weight, based on the material to be stabilized, of this mixture.

16 Claims, No Drawings

MIXTURE FOR STABILIZING POLYURETHANES

BACKGROUND OF THE INVENTION

FIELD OF THE INVENTION

The present invention relates to a novel mixture for stabilizing polyurethanes, containing (a) an amine based on a derivative of 1,2,2,6,6-tetramethylpiperidine, (b) a mixture of substituted 2-phenylbenzotriazoles and (c) α-tocopherol, if necessary mixed with tris-(nonylphenyl) phosphite, and polyurethanes which contain the novel stabilizer mixture.

It is known that polyurethanes are very rapidly destroyed by the effect of light. This descruction usually appears in the form of yellowing or discoloration and in embrittlement of the polymeric material.

A number of light stabilizers for polyurethanes have already been described, the stabilizers belonging to the class consisting of the sterically hindered amines, the class consisting of the UV absorbers and the class consisting of the deoxidants. However, it has to date been impossible to achieve any satisfactory protection from destruction by the effect of light by using the known stabilizers in polyurethanes.

Although improved light stabilization is achieved by using combinations of the compounds of the stated classes, the high concentration of additives which is required for effective protection often leads to undesirable changes in the polymer properties and to compatibility problems, for example exudation, chalking, formation of coatings or color changes.

Stabilizers which are in the solid state also frequently have the disadvantage that they are poorly soluble, or dissolve only slowly, in the starting components of the polyurethane, which may lead to processing problems, such as blocking of nozzles or longer processing times.

SUMMARY OF THE INVENTION

It is an object of the present invention to provide stabilizer mixtures which permit effective light stabilization for polyurethanes without the undesirable side effects.

We have found that this object is achieved by a mixture for stabilizing polyurethanes, containing (a) an amine of the formula I

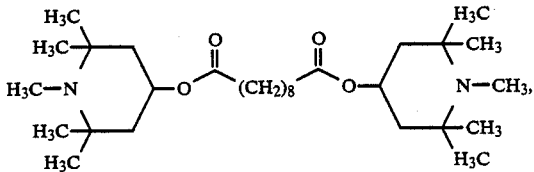

(b) a mixture of the benzotriazoles II and III

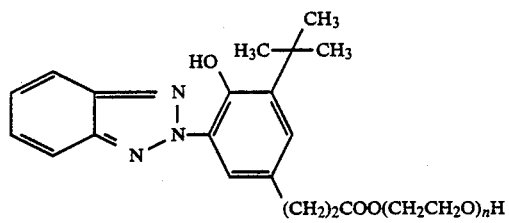

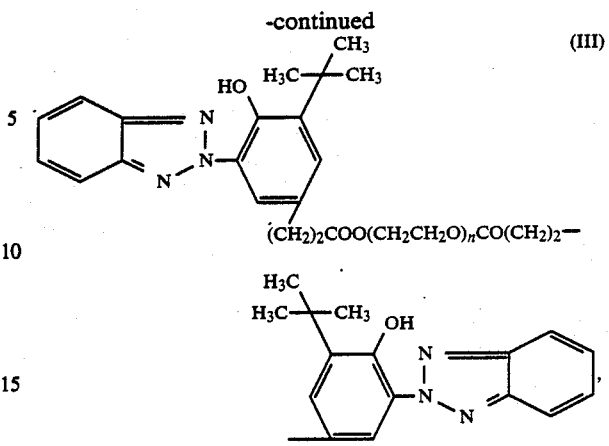

in which n is chosen so that the mean molecular weight of the mixture is greater than 600, and (c) α-tocopherol, if necessary mixed with tris-(nonylphenyl) phosphite.

DETAILED DESCRIPTION OF THE PREFERRED EMBODIMENTS

A preferred mixture is one in which, in component (c), α-tocopherol is present as a mixture with tris-(nonylphenyl) phosphite. The weight ratio fo α-tocopherol to tris-(nonylphenyl) phosphite is from 1:10 to 10:1, preferably from 1:6 to 1:10, in particular 1:10.

In the mixture according to the invention, the weight ratio of component (a) to component (b) to component (c) is, for example, from 1:0.25:0.2 to 1:5:2.5, preferably from 1:0.5:0.2 to 1:2:1, in particular 1:1:0.5

For the upper limit of the means molecular weight of the benzotriazoles II and III, n is generally chosen so that the mean molecular weight of the mixture is from 600 to 1,000.

Components (a), (b) and (c) are all known.

Component (a) is described in U.S. Pat. No. RE 31,343. The preparation of benzotriazoles which are similar to those of component (b) is described in EP-A-57 160. Component (c) is disclosed in the prior Patent Application DE-A-3 634 531, as a mixture of α-tocopherol and tris-(nonylphenyl) phosphite.

The stabilizer mixture according to the invention is used in an amount of from 0.005 to 5, preferably from 0.05 to 2.5, in particular from 0.1 to 2, % by weight, based on the material to be stabilized. It is also possible to add the components (a), (b) and (c) individually, the novel mixture being formed in situ.

The stabilizer mixture is usually added by dissolving it in the polyol component of the polyurethane at room temperature, if necessary with gentle heating. However, incorporation may also be effected by direct mixing into the polymer melt by a method conventionally employed in industry, before or during the molding procedure. It is also possible to apply the stabilizer mixture to the polymer directly or to mix it into a solution, suspension or emulsion of the polymer, if necessary with subsequent evaporation of the solvent.

The present invention furthermore relates to polyurethanes containing from 0.005 to 5% by weight, based on the material to be stabilized, of the abovementioned stabilizer mixture.

Surprisingly, the mixture according to the invention has an unusually powerful synergistic effect in the stabilization of polyurethanes. It shows little or no secondary effects on the polymer properites and prevents yellowing of the polymer under the action of light.

Another advantage of the novel mixture in terms of application is that the components present in said mixture are readily miscible with one of the polyurethane starting components, for example the polyol component, and dissolve without leaving a residue or causing opacity.

The Examples which follow illustrate the invention.

EXAMPLES

Preparation of the exposure samples:

A polyol component consisting of 41.9 g of a polyetherol (OH number 29.0), which had been obtained by an addition reaction of propylene oxide and ethylene oxide with propylene glycol and possessed about 84% of primary hydroxyl groups, 42.5 g of a polyetherol (OH number 27.0), which had been obtained by an addition reaction of propylene oxide and ethylene oxide with trimethylolpropane and possessed about 88% of primary hydroxyl groups, 8.1 g of butane-1,4-diol, 1,724 g of a 25% strength by weight solution of diazabicyclooctane in butane-1,4-diol, 0.016 g of dibutyltin dilaurate, 0.1 g of a silicone-based stabilizer, 5.49 g of fluorotrichloromethane and 0.17 ml of water was mixed with the stabilizers stated below and, together with a prepolymer containing 23.0% of isocyanate groups, in a weight ratio of 100:48.5, was expanded to give test sheets at 25° C. (temperature of components and mold).

The NCO prepolymer was prepared from 87.17 g of 4,4'-diphenylmethane diisocyanate, 4.83 g of a polyetherol (OH number 250) which had been obtained by addition reaction of propylene oxide with propylene glycol, and 8.0 g of dipropylene glycol.

The test sheets were exposed in a Xenotest 450 apparatus and the yellowness index according to ASTM D 1925 was then determined. The results are shown in Table 1.

TABLE 1

| Stabilizer mixture | Concentration [% by wt., based on the polyol component] | Yellowness index according to ASTM D 1925 in Xenotest 450 after | |
|---|---|---|---|
| | | 0 h | 48 h |
| Without | | 3.8 | 33.8 |
| stabilizer Mixture 1 (according to the invention) | | | |
| Component a | 0.5 | | |
| Component b | 0.5 | 4.3 | 16.8 |
| Component c | 0.25 | | |
| Mixture 2 (comparison) | | | |
| Component a | 0.5 | | |
| Component 1 | 0.5 | 4.8 | 19.7 |
| Component 2 | 0.25 | | |
| Mixture 3 (comparison) | | | |
| Component a | 0.5 | | |
| Component b | 0.5 | 4.6 | 17.9 |
| Component 2 | 0.25 | | |

The following definitions apply to the above:

Component (a) = amine of the formula I
Component (b) = mixture of the benzotriazoles II and III
Component (c) = mixture of α-tocopherol and tris-(nonylphenyl) phosphite in a weight ratio of 1:10.

Component 1 = 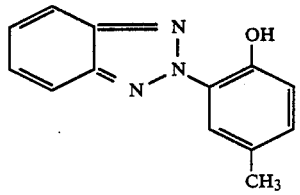

Component 2 = 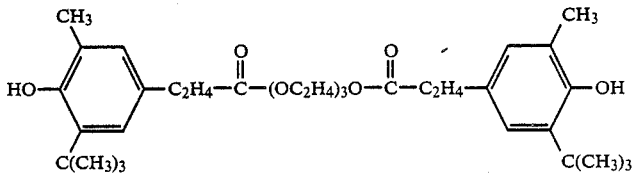

We claim:

1. A mixture for stabilizing polyurethanes, containing:

(a) an amine of the formula (I):

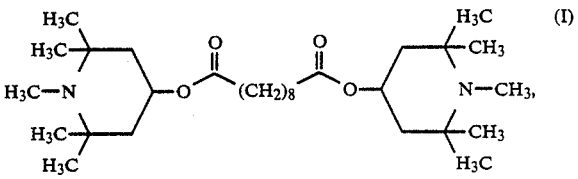

(b) a mixture of benzotriazoles (II) and (III)

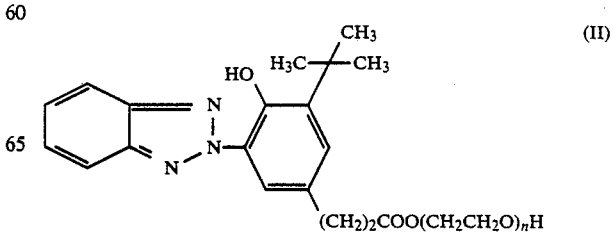

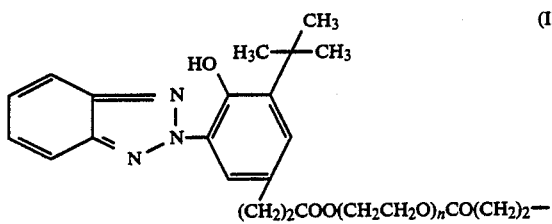

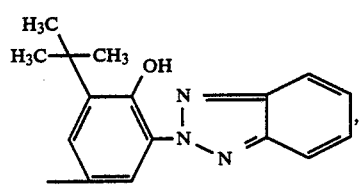

in which n is chosen so that the mean molecular weight of the mixture is greater than 600; and (c) α-tocopherol.

2. The mixture of claim 1, wherein component (c) further comprises tris(nonylphenyl) phosphite.

3. The mixture of claim 2, wherein, in component (c), the weight ratio of α-tocopherol to tris(nonylphenyl) phosphite is from 1:10 to 10:1.

4. The mixture of claim 3, wherein said weight ratio is 1:6 to 1:10.

5. The mixture of claim 1, wherein components (a), (b) and (c) are present in a weight ratio of component (a) to component (b) to component (c) of 1:0.25:0.2 to 1:5:2.5.

6. The mixture of claim 5, wherein said weight ratio is 1:05:0.2 to 1:2:1.

7. The mixture of claim 1, wherein said mean molecular weight is from 600 to 1000.

8. A polyurethane containing from 0.005 to 5.0% by weight, based on the material to be stabilized, of a stabilizer mixture containing:

(a) an amine of the formula (I):

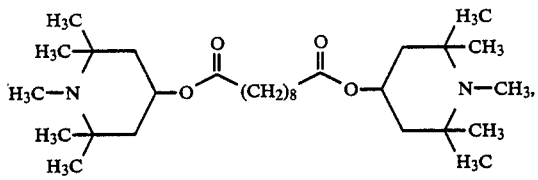

(b) a mixture of benzotriazoles (II) and (III)

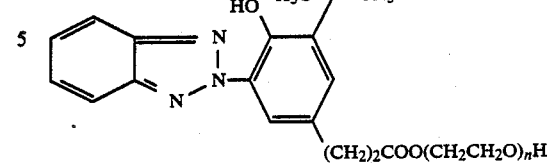

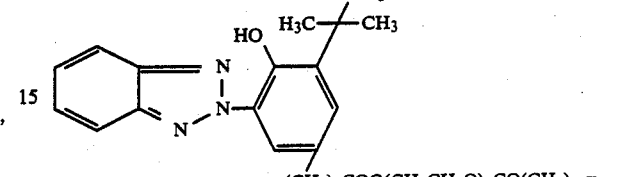

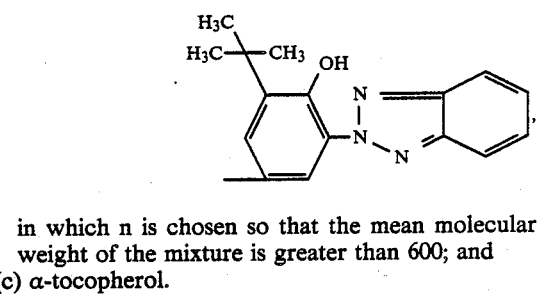

in which n is chosen so that the mean molecular weight of the mixture is greater than 600; and (c) α-tocopherol.

9. The polyurethane of claim 8, wherein component (c) further comprises tris(nonylphenyl) phosphite.

10. The polyurethane of claim 9, wherein in component (c), the weight ratio of α-tocopherol to tris(nonylphenyl) phosphite is from 1:10 to 10:1.

11. The polyurethane of claim 10, wherein said weight ratio is 1:6 to 1:10.

12. The polyurethane of claim 8, wherein components (a), (b) and (c) are present in a weight ratio of component (a) to component (b) to component (c) of 1:0.25:0.2 to 1:5:2.5.

13. The polyurethane of claim 12, wherein said weight ratio is 1:05:0.2 to 1:2:1.

14. The polyurethane of claim 8, wherein said mean molecular weight is from 600 to 1000.

15. The polyurethane of claim 8, wherein said stabilizer mixture is present in an amount of from 0.05 to 2.5% by weight.

16. The polyurethane of claim 8, wherein said stabilizer mixture is present in an amount of from 0.1 to 2% by weight.

* * * * *